United States Patent [19]

Oda et al.

[11] 4,277,565

[45] Jul. 7, 1981

[54] MACROMOLECULAR ADSORBENT CONTAINING PENDANT DIFLUOROALKYL PHOSPHATE GROUPS FOR ADSORBING HEAVY METAL IONS

[75] Inventors: Yoshio Oda, Yokohama; Masaaki Yamabe, Machida; Masao Kato, Yokohama, all of Japan

[73] Assignee: Asahi Glass Company, Ltd., Tokyo, Japan

[21] Appl. No.: 25,102

[22] Filed: Mar. 29, 1979

[30] Foreign Application Priority Data

Apr. 12, 1978 [JP] Japan .................................. 53/42150

[51] Int. Cl.³ ...................... C08F 230/02; C08F 8/40; C01G 43/00
[52] U.S. Cl. ...................................... 521/31; 526/277; 526/278; 423/7; 525/340; 525/327
[58] Field of Search ................. 423/7; 521/25, 30, 38; 526/277, 278

[56] References Cited

U.S. PATENT DOCUMENTS

| | | | |
|---|---|---|---|
| 2,764,562 | 9/1978 | Zong | 521/38 |
| 3,678,012 | 7/1972 | Matsuda et al. | 526/277 |
| 4,116,890 | 9/1956 | Drake | 521/30 |

OTHER PUBLICATIONS

Chemical Abstracts, vol. 87, 145198b, INIS-MF-3321.

*Primary Examiner*—Joseph L. Schofer
*Assistant Examiner*—Peter F. Kulkosky
*Attorney, Agent, or Firm*—Oblon, Fisher, Spivak, McClelland & Maier

[57] ABSTRACT

A macromolecular adsorbent is suitable for recovering heavy metal ions such as uranium ions from a dilute solution such as sea water and is a polymer having pendant groups having the formula

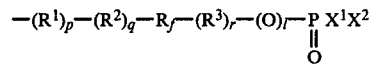

wherein $R^1$ represent a $C_1$–$C_8$ divalent organic group; $R^2$ and $R^3$ respectively represents a $C_1$–$C_5$ divalent organic group; p, q, r and l respectively represent 0 or 1; $R_f$ represents a $C_1$–$C_{10}$ divalent perfluoro group; $X^1$ and $X^2$ respectively represent hydroxyl group or a hydroxyl convertible group or atom.

13 Claims, No Drawings

MACROMOLECULAR ADSORBENT CONTAINING PENDANT DIFLUOROALKYL PHOSPHATE GROUPS FOR ADSORBING HEAVY METAL IONS

BACKGROUND OF THE INVENTION

1. Field of the Invention

The present invention relates to a macromolecular adsorbent for adsorbing heavy metal ions. More particularly, it relates to macromolecular adsorbent suitable for recovering heavy metal ions from a dilute solution.

2. Description of Prior Arts

It has been proposed to use inorganic adsorbents such as titanic acid, aluminum hydroxide, iron hydroxide, lead sulfide, and basic zinc carbonate, especially titanic acid having high adsorbing function supported on activated carbon, as an adsorbent for collecting trace components such as uranium component in sea water, in Japanese Patent Publication No. 648/1974.

These inorganic adsorbents have disadvantages that a molding is not easy and brittle in comparison with an organic adsorbent and a recovery efficiency is remarkably decreased by repeating adsorption-desorption.

On the other hand, it has been also proposed to use organic adsorbents such as arsonic acid type resins (such as British Pat. No. 948,962), hydroxyphenyl compound-formaldehyde condensates having phosphono group bonded to the aromatic ring (Japanese Unexamined Patent Publication No. 114510/1977). These organic adsorbents have disadvantages that toxic arsenic compound is used as a starting material or adsorbing functions and durabilities are not satisfactory for practical applications.

SUMMARY OF THE INVENTION

It is an object of the present invention to provide a macromolecular adsorbent which is useful for adsorbing trace of heavy metal ions.

It is another object of the present invention to provide a macromolecular adsorbent which is useful for adsorbing uranium component in an aqueous solution such as sea water.

It is the other object of the present invention to provide a macromolecular adsorbent which has high abrasion resistance, stable adsorbing function, high ion-exchange activity, high adsorbing velocity and less damage.

The foregoing and other objects of the present invention have been attained by providing a macromolecular adsorbent for adsorbing heavy metal ions which is a polymer having pendant groups having the formula

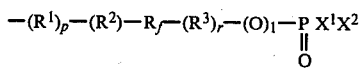

wherein $R^1$ represents a $C_1$-$C_8$ divalent organic group; $R^2$ and $R^3$ respectively represent a $C_1$-$C_5$ divalent organic group; p, q, r and l respectively represent 0 or 1; $R_f$ represents a $C_1$-$C_{10}$ divalent perfluoro group; $X^1$ and $X^2$ respectively represent hydroxyl group or a hydroxyl convertible group or atom.

DETAILED DESCRIPTION OF THE PREFERRED EMBODIMENTS

The inventors have studied and found the fact that polymers having pendant groups of perfluoro group, phosphono group

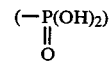

or a phosphono convertible group which can be converted to phosphono group by a hydrolysis (hereinafter phosphono group and the phosphono convertible group are referred to simply as phosphono group) are remarkably superior to the other polymers for adsorbing heavy metal ions such as uranium ions.

These polymers can be used as adsorbents having advantages that the polymers have excellent abrasion resistance and stable adsorbing function superior to inorganic adsorbents; and the polymers have perfluoro group which improve ion-exchange activity of phosphono group to increase heavy metal ion adsorbing function especially adsorbing velocity; and the polymers have less damage caused by elution because of fluorinated polymers and have excellent durability in repeating uses in adsorption for contacting with a dilute solution such as sea water for a long time and desorption of heavy metal ions. Moreover, the polymers are organic macromolecular compound whereby the polymers can be fabricated in desirable shape or size especially in porous structure having large surface area to make easy permeation of a solution and to increase efficiency of ion exchange groups.

In the present invention, it is important feature to have pendant groups of perfluoro group and phosphono group. When either of perfluoro group or phosphono group is not included as the pendant group, such as no perfluoro group or no phosphono group but sulfonic acid group or carboxylic acid group, the durability and the adsorbing function are inferior, disadvantageously.

In the formula, $R^1$ represents a $C_1$-$C_8$ divalent organic group, which is given by the structure of the pendant group of the skeleton polymer when the pendant groups are introduced by the macromolecular reaction. $R^1$ can be phenylene, alkylene, oxyalkylene, carboxyl and alkyleneamide group. From the viewpoints of easy introduction of perfluoro group and the phosphono group, and a stability of the polymer used as the adsorbent under an adsorption-desorption condition, $R^1$ is preferably selected from phenylene, alkylene and oxyalkylene groups and especially phenylene groups.

In the formula, $R^2$ and $R^3$ respectively represent a $C_1$-$C_5$ divalent organic group and preferably alkylene or oxyalkylene group. In the formula p, q, r and l are respectively 0 or 1. It is preferable to be l=0. In the formula, $R_f$ represents a $C_1$-$C_{10}$ divalent perfluoro group and preferably straight or branched perfluoroalkylene or oxyperfluoroalkylene group. From the viewpoint of easy availability, $R_f$ is preferably a perfluoroalkylene group.

In the formula, $X^1$ and $X^2$ respectively represent hydroxyl group or hydroxyl convertible atom or group which can be converted into hydroxyl group by a hydrolysis, such as halogen atoms, alkylamino group and morpholino group

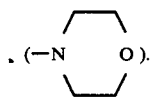

Typical examples of the pendant group having the formula include

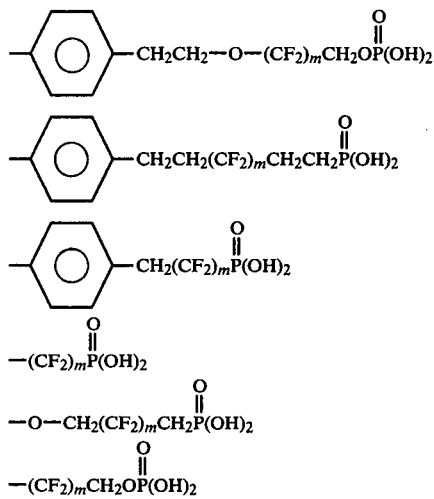

wherein m is an integer of 1 to 10.

The polymers having the specific pendant groups can be produced by the following two processes.

In one process, a monomer having a perfluoro group and a phosphono group is polymerized or copolymerized. An addition polymerization or a polycondensation process can be applied for the process.

In the other process, a macromolecular reaction is carried out. The perfluoro group and the phosphono group are introduced into the skeleton polymer by reacting suitable reagent.

The skeleton polymer can be a fluorinated or a nonfluorinated polymer. The object polymer can be obtained by reacting a reagent having perfluoro group and a site for introducing phosphono group such as hydroxyl group or a halogen atom, and then, introducing phosphono group.

When a skeleton polymer having a perfluoro group as a pendant group is used, the object polymer can be obtained by reacting with a reagent having a site for introducing phosphono group as a pendant group and then, introducing phosphono group.

When the skeleton polymer having a perfluoro group and a site for introducing phosphono group as a pendant group is used, the object polymer can be obtained by introducing phosphono group.

The latter process is preferably employed from the viewpoints of easy availability of the starting materials and easy fabricatability to form an adsorbent having porous structure for high adsorbing efficiency.

In the adsorbent of the present invention, the pendant group such as

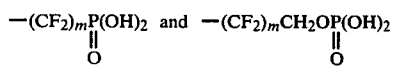

can be bonded through the ether bond on the main chain of the polymer. For example, polymers having the pendant group of

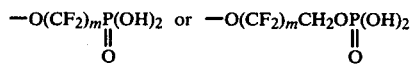

can be obtained by a polymerization or a copolymerization of vinyl ether monomer having specific pendant group.

Polymers having pendant group of

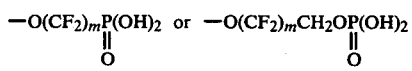

can be also obtained by introducing phosphono group into skeleton polymers such as polymers or copolymers of perfluorovinyl ether such as

In the preferable embodiment of the present invention, the polymer has a phosphono group content of more than 0.2 meq/g dried H tye adsorbent preferably more than 0.4 meq/g dried H type adsorbent. The fluorine content in the polymer can be varied depending upon the form of fluorine atoms and it is more than the same number with the phosphono groups. It is preferable to have two or more fluorine atoms per one phosphono group.

In the polymer of the present invention, it is preferable to have at least the same number of fluorine atom per phosphorus atom, especially more than two times thereof in the pendant group having phosphono group. Fluorine atom need not be included in the main chain of the polymer.

Certain examples of preparations of the adsorbents of the present invention will be illustrated.

For example, the pendant group having a perfluoro group and a phosphono group can be introduced into a polystyrene type polymer by the following process:

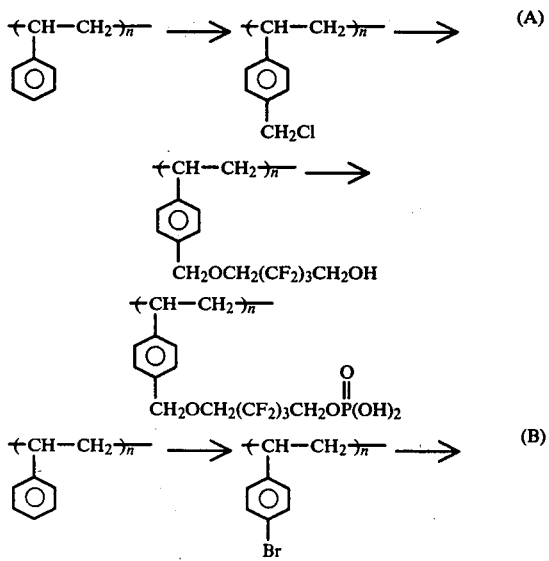

-continued

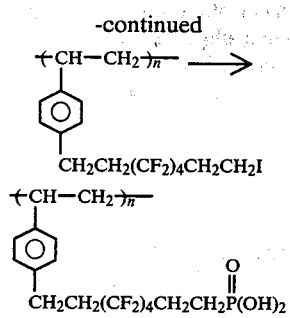

For example, phosphono groups can be introduced into a fluorinated polymer having sites for introducing them, by the following process:

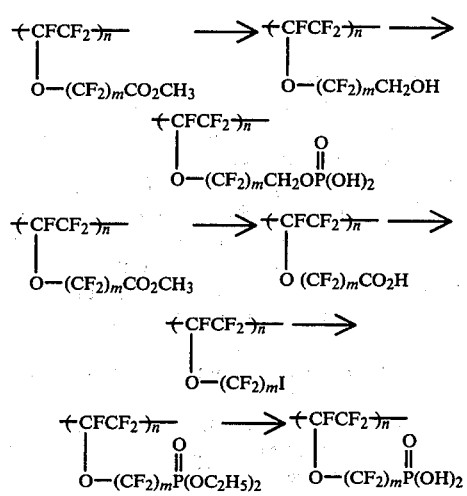

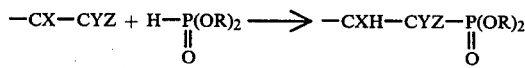

The phosphono group can be also introduced into a fluorinated polymer having pendant groups having a double bond, by reacting $H_3PO_3$ or $HP(O)(OR)_2$ (R=alkyl group) with the polymer, preferably in the presence of a radical source, as follows:

$$-CX-CYZ + H-\underset{\underset{O}{\|}}{P}(OR)_2 \longrightarrow -CXH-CYZ-\underset{\underset{O}{\|}}{P}(OR)_2$$

(X, Y and Z represent H or F and R represents H or an alkyl group).

When a polystyrene type polymer is used as a skeleton polymer in the step (A),(B), a homopolymer and various copolymers of styrene can be used. A styrene copolymer crosslinked with 0.1 to 10% of divinylbenzene is a desired skeleton polymer. Polymers such as polystyrene type polymers can be various forms such as beads, fiber, preferably porous beads.

In the introduction of perfluoro groups and phosphono groups, it is usual to form sites for introducing them, by a chloromethylation or a bromination and then, to react a perfluoro compound and a phosphorus compound.

For example, a fluorinated diol is reacted with a chloromethylated polystyrene and then phosphorus oxychloride is reacted with the product. In the other example, a diiodofluoroalkane is reacted with a brominated polystyrene and then, triethylphosphite or a sodium dialkyl phosphite is reacted with the product.

The other skeleton polymers suitable for the purposes include a homopolymer of $\alpha,\beta,\beta$-trifluorostyrene and copolymers of $\alpha,\beta,\beta$-trifluorostyrene and one of vinyl monomers especially a fluoroolefin.

The fluorinated polymers used as the skeleton polymer in the step of (C) and (D) usually have perfluoro groups in the pendant groups. Therefore, the polymers can be converted into the adsorbents of the present invention by introducing phosphono groups.

Homopolymers having sites for introducing them can be used. However, copolymers of a fluoroolefin such as tetrafluoroethylene are usually used as the skeleton polymer.

The macromolecular adsorbent of the present invention usually has an average molecular weight of more than 20,000. When a fluorinated polymer is the skeleton polymer, an average molecular weight can be about 1,000,000 preferably about 50,000 to about 800,000.

The adsorbents of the present invention can be also produced by polymerizing or copolymerizing a monomer having the specific pendant group.

When the macromolecular adsorbent of the present invention is used for recovering heavy metal ions from a dilute solution, various methods such as column method, slurry method, fluidized bed method and a method of immersing the adsorbent can be employed.

The shape of the macromolecular adsorbent of the present invention can be various shapes such as beads, fiber and flake. In usual, porous adsorbent having a large specific surface area is preferably used since an adsorbing velocity is high.

Porous beads are especially advantageous to have a large surface area and easy immersing of the solution and fast heavy metal ion adsorbing velocity. A diameter of the bead is not critical and is preferably 10–200 mesh especially 20–50 mesh because of easy handling. The desorption and the recovery of the adsorbed heavy metal ions can be carried out by the conventional methods.

The macromolecular adsorbent is useful for collecting uranium component from a dilute solution of uranium compound such as sea water and also a solution of uranium compound having various content of uranium compound such as from several ppm to several hundreds ppm.

The macromolecular adsorbent has high adsorbing function for the heavy metal ions such as iron, copper, zinc, cadmium, mercury, lead, nickel and chromium ions and is useful for treating an industrial waste water.

The present invention will be further illustrated by certain examples and references which are provided for purposes of illustration only and are not intended to be limiting the present invention.

EXAMPLE 1

A chloromethylation of 10.4 g of crosslinked polystyrene beads (Amberlite XE-305 manufactured by Rhom & Haas Co.) was carried out by the conventional process to obtain 14.4 g of poly (p-chloromethylstyrene). As the result of the analysis, it was found that 19.0% (5.36 m mole/g) of chlorine component was introduced. The resulting poly(p-chloromethylstyrene) beads (3.87 g) were suspended in a mixture of 60 ml of tetrahydrofuran, 20 ml of dimethylformamide and 17.6 g of 2,2,3,3,4,4-hexafluoro-1,5-pentandiol. The suspension was cooled at $-20°$ C. and 1.5 g of sodium hydride was gradually added in nitrogen atmosphere. After adding all of sodium hydride, the mixture was thoroughly stirred at room temperature for 2 hours and at 50° C. for 3 hours and at 80° C. for 6 hours. After cooling the reaction mixture and filtering it, the solid component was washed with a mixture of water/tetrahydrofuran and then with tetrahydrofuran and dried under a reduced pressure to obtain 6.2 g of fluorinated polymer beads. According to an elementary analysis, a fluorine content was 20.4% (10.7 meq/g). IR spectrum indicated the following bands.

$3400^{cm-1}$ (OH); $1150^{cm-1}$ and $1115^{cm-1}$ ($CF_2$)

A suspension of 882 mg of the fluorinated polymer beads in a mixture of 10 ml of tetrahydrofuran and 1 ml of triethylamine was cooled at $-20°$ C. and 3.5 ml of phosphorus oxychloride was added and the mixture was stirred at room temperature for 6 hours. The beads were filtered and washed with water/tetrahydrofuran and then with tetrahydrofuran and then, hydrolyzed at room temperature with 10 ml of dioxane/pyridine (2:1). The beads were filtered and washed with water/tetrahydrofuran and with tetrahydrofuran and dried under a reduced pressure to obtain 1.34 g of an ion-exchange resin having phosphoric acid groups. IR spectrum indicated the following bands.

$2700^{cm-1}$, $1150^{cm-1}$, $1115^{cm-1}$ and $1010^{cm-1}$.

The content of phosphoryl group in the polymer was 0.9 meq/g.

EXAMPLE 2

(a) A bromination of 21.2 g of crosslinked polystyrene beads (Amberlite XE-305 manufactured by Rhom & Haas Co.) was carried out to obtain 30.6 g (3.69 meq/g) of poly(p-bromostyrene) beads.

(b) n-Butyl lithium was added to a suspension of 2.1 g of the beads obtained by the step (a) in 40 ml of benzene. The resulting product was treated with 12.5 g of 1,8-diiodo-3,3,4,4,5,5,6,6-octafluorooctane and 50 ml of tetrahydrofuran at $-70°$ C. The resulting mixture was stirred at room temperature for 15 hours. The mixture was heated at 80° C. for 2 hours. After cooling the reaction mixture, the beads were filtered and washed with water/tetrahydrofuran, with tetrahydrofuran and with methylenechloride and dried under a reduced pressure to obtain 3.0 g of dried beads. IR spectrum indicated the following bands.

$1220^{cm-1}$, $1170^{cm-1}$, $1120^{cm-1}$.

The content of iodine was 14.6% (1.2 meq/g) and the content of fluorine was 12.7% (6.7 meq/g).

(c) A suspension of 846 mg of the beads obtained by the step (b) in 2.0 ml of triethylphosphite was heated at 60° C. for 18 hours. The resulting beads were filtered and washed with tetrahydrofuran and suspended in 5 ml of a mixture of dioxane and conc. hydrochloric acid (2:1). The suspension was refluxed for 3 hours. The beads were filtered and washed with water/tetrahydrofuran and then with tetrahydrofuran and dried under a reduced pressure to obtain 783 mg of an ion-exchange resin having phosphono group. The content of phosphono group was 0.4 meq/g.

REFERENCE 1

Each uranium adsorption test was carried out by using the following six adsorbents.

(A) Adsorbent obtained in Example 1;
(B) Adsorbent obtained in Example 2;
(C) Amberlite XE-305;
(D) Adsorbent obtained by introducing

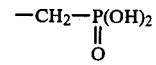

into Amberlite XE-305;
(E) Adsorbent of perfluoropolymer having 0.83 meq/g of —O—$(CF_2)_2$—$SO_3H$;
(F) Adsorbent of perfluoropolymer having 1.46 meq/g of —O—$(CF_2)_3$—COOH;
(G) Adsorbent obtained by introducing

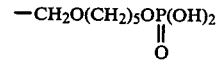

into the Adsorbent (C).

An aqueous solution of uranyl nitrate (1000 ppm of uranium component) was diluted with a standard sea water (NaCl: 23,000 ppm; $MgCl_2$: 5,000 ppm; $Na_2SO_4$: 4,000 ppm; $CaCl_2$: 1,000 ppm) to 1,000 times. An aqueous solution of sodium carbonate was added to the diluted solution to adjust pH of 8.1.

The aqueous solution (uranium content: 1.0 ppm corresponding to 300 times of uranium component to that of natural sea water) and 20 to 100 mg of each Adsorbent was charged in 100 ml Erlenmeyer flask. The mixture was shaken at room temperature for the specific time and the Adsorbent was filtered and the uranium concentration in the filtrate was measured and the amount of the adsorbed uranium component was calculated. The results are shown in Table 1.

TABLE 1

| Adsorbent | Adsorbing time | Amount of adsorbed uranium component ($\mu$g-U/g-adsorbent) |
|---|---|---|
| A | 30 | 1920 |
| A | 62 | 4150 |
| B | 30 | 890 |
| C | 30 | 13 |
| D | 30 | 360 |
| E | 30 | 360 |
| F | 30 | 240 |
| G | 30 | 440 |

EXAMPLE 3

A suspension of 5.0 g of a powdery polymer having a molecular weight of about 500,000 and a molar ratio of $CF_2$=$CFO(CF_2)_3CO_2CH_3/C_2F_4$ of 20:80 in 40 ml of dehydrated tetrahydrofuran, was admixed with 420 mg of lithium aluminum hydride ($LiAlH_4$). The mixture was refluxed for 2 hours in nitrogen atmosphere. The reaction mixture was treated with ethanol under cooling it to decompose excess of $LiAlH_4$. The resulting reaction mixture was poured into a mixture of ice and diluted hydrochloric acid. Then, the resulting insoluble polymer was separated by filtration and washed with a mixture of ethanol and water (1:1 by vol.) and then, with ethanol and water and dried under a reduced pressure to obtain 4.9 g of white polymer. IR spectrum indicated the following bands.

$3400^{cm-1}$(OH)

This shows the fact that —O(CF$_2$)$_3$CO$_2$CH$_3$ group in the starting material was converted to —O(CF$_2$)$_3$CH$_2$OH group.

A phosphorylization of the resulting polymer having —O(CF$_2$)$_3$CH$_2$OH groups was carried out by reacting phosphorus oxychloride and then, a hydrolysis was carried out by the process of Example 1 to obtain 5.2 g of a polymer having

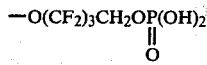

group.

The content of phosphoryl group in the polymer was 0.48 meq/g.

EXAMPLE 4

The polymer having —O(CF$_2$)$_3$CO$_2$CH$_3$ groups of Example 3 was used as a starting material. A hydrolysis of 30 g of the polymer was carried out with NaOH and HCl by the conventional process to obtain 29.5 g of a carboxylic acid type polymer. IR spectrum indicated the following bands.

1784$^{cm-1}$ (carbonyl group)

This shows the fact that —O(CF$_2$)$_3$CO$_2$CH$_3$ group was converted to —O(CF$_2$)$_3$COOH group. Then, 20 g of the carboxylic acid type polymer was added to 300 ml of 1,1,2-trifluoro-1,2,2-trichloroethane (R-113) to swell it and then, 21.3 g of iodine and 6.3 g of benzoyl peroxide were charged into the swollen mixture. The mixture was stirred and heated at 100° C. for 3 hours and then, at 120° C. for 2 hours. The reaction mixture was cooled and the resulting polymer was filtered. The polymer was washed with acetone, with methanol/1,1,2-trifluoro-1,2,2-trichloroethane and then with 1,1,2-trifluoro-1,2,2-trichloroethane and dried at 80° C. under a reduced pressure for 16 hours to obtain 23.4 g of the polymer. In the reaction, —O(CF$_2$)$_3$COOH group was converted to —O(CF$_2$)I. The content of iodine component in the polymer was 15.6% (1.23 meq/g).

A suspension of 20 g of the resulting polymer having —O(CF$_2$)HD 3I in 300 ml of 1,1,2-trifluoro-1,2,2-trichloroethane was admixed with 21.7 g of tetraethyl pyrophosphite and 4.1 g of di-t-butylperoxide. The mixture was stirred and heated at 100° C. for 2 hours and then at 120° C. for 3 hours. The suspension of the polymer was cooled at 0° C. in nitrogen atmosphere and it was oxidized by adding 50 ml of a methanol solution containing 11.34 g of t-butylhydroperoxide. The resulting polymer was filtered and washed with methanol and dried under a reduced pressure. The polymer was added to 50 ml of conc. hydrochloric acid and the mixture was refluxed for 4 hours. The resulting polymer was washed with water and dried under a reduced pressure to obtain 19.8 g of the polymer having

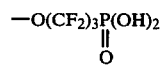

groups. The content of phosphonyl group in the polymer was 0.8 meq/g.

REFERENCE 2

Each uranium adsorption test was carried out by using the following three adsorbents.

(A') Adsorbent obtained in Example 3;
(B') Adsorbent obtained in Example 4;
(C') Adsorbent obtained by hydrolyzing
the polymer used as the starting material in Example 3 (—O(CF$_3$)$_3$COOH groups).

An aqueous solution of uranyl nitrate (1000 ppm of uranium component) was diluted with the standard sea water to 1,000 times. An aqueous solution of sodium carbonate was added to the diluted solution to adjust H of 8.1.

In accordance with the test method of Reference 1 except using these Adsorbents, each uranium adsorption test was carried out by shaking the Adsorbent in the aqueous solution (uranium content: 1.0 ppm) at room temperature for 30 hours. The results are shown in Table 2.

TABLE 2

| Adsorbent | Amount of adsorbed uranium component (μg-U/g-adsorbent) |
|---|---|
| A' | 200 |
| B' | 250 |
| C' | ~0 |

REFERENCE 3

A model waste water containing 10 ppm of metal ions and having pH of 7 was used.

Four kinds of model waste water containing one of lead nitrate, chromium nitrate (II) mercury nitrate (II) and cadmium nitrate was used for each metal ion adsorption test.

In each test, 1 g of the Adsorbent A of Example 1 was added to 2 liters of each model waste water and the mixture was stirred at 30° C. for 20 hours and the Adsorbent was separated by a filtration. The Adsorbent was immersed in 1 N-HCl and the adsorbed metal ions were desorbed by heating it at 60° C. for 30 minutes, The Adsorbent was separated by a filtration and 100 ml of the filtrate was used for measuring metal ions. The results of the measurements are shown in Table 3.

TABLE 3

| Metal ion | Amount of absorption (mg) | Recover rate (%) |
|---|---|---|
| Pb | 19.1 | 95.5 |
| Hg | 19.3 | 96.5 |
| Cd | 18.6 | 93.0 |
| Cr | 19.4 | 97.0 |

What is claimed is:

1. A macromolecular adsorbent capable of adsorbing heavy metal ions, which comprises:

a polymer having pendant groups of the formula:

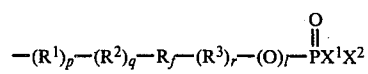

wherein R' is a C$_1$–C$_8$ divalent organic group; R$^2$ and R$^3$ are each a C$_1$–C$_5$ divalent organic group: p, q, r and l each are 0 or 1; R$_f$ is a C$_1$–C$_{10}$ divalent perfluoro group; and X$^1$ and X$^2$ each are hydroxyl or a substituent convertible to a hydroxy group.

2. The adsorbent of claim 1, wherein the content of phosphono groups in said polymer is greater than 0.2 meq/g polymer.

3. The adsorbent of claim 1, wherein said polymer is formed by reacting a divalent perfluro radical containing group with a skeleton polymer thereby bonding said divalent perfluoro radical containing group to said skeleton polymer and then phosphonolating said attached divalent perfluoro radical containing group.

4. The adsorbent of claim 1, wherein said polymer is formed by polymerizing a monomer containing a divalent perfluoro organic radical having a functional site, and then phosphonolating said functional site on said divalent perfluoro organic radical.

5. The adsorbent of claim 1, wherein said polymer is derived from a skeleton polymer having a porous structure.

6. The adsorbent of claim 1, wherein said polymer is derived from a skeleton polystyrene polymer.

7. The adsorbent of claim 6, wherein said skeleton polystyrene polymer is a cross-linked polystyrene bead.

8. The adsorbent of claim 1, wherein said polymer has a molecular weight of greater than 20,000.

9. The adsorbent of claim 1, wherein said polymer is formed by halogenating polystyrene, reacting said halogenated polystyrene with a divalent organic halide compound containing a divalent perfluoro group, and then phosphonolating said divalent organic group attached to said polystyrene.

10. The adsorbent of claim 1, wherein said polymer is formed by halomethylating polystyrene, reacting said halomethylated polystyrene with an organic diol compound containing a divalent perfluoro group, thereby bonding said diol compound to said polystyrene by one of the alcohol functional groups, and then phosphonolating the remaining alcoholic functional group of said attached perfluoro group containing radical.

11. The adsorbent of claim 1, wherein said polymer is formed by polymerizing an unsaturated monomer containing a pendant —CX=CYZ group, and then phosphonolating said pendant unsaturated group.

12. The adsorbent of claim 1, wherein said substituent convertible to a hydroxy group is a halogen atom, an alkylamino group or a morpholino group.

13. The adsorbent of claim 1, wherein said R' group is phenylene, alkylene, oxyalkylene, carboxyl or an alkylenamide group, and wherein said $R^2$ and $R^3$ groups are alkylene or oxyalkylene.

* * * * *